Sept. 27, 1949.     L. J. BLACK     2,482,827
BABY VEHICLE
Filed July 28, 1947
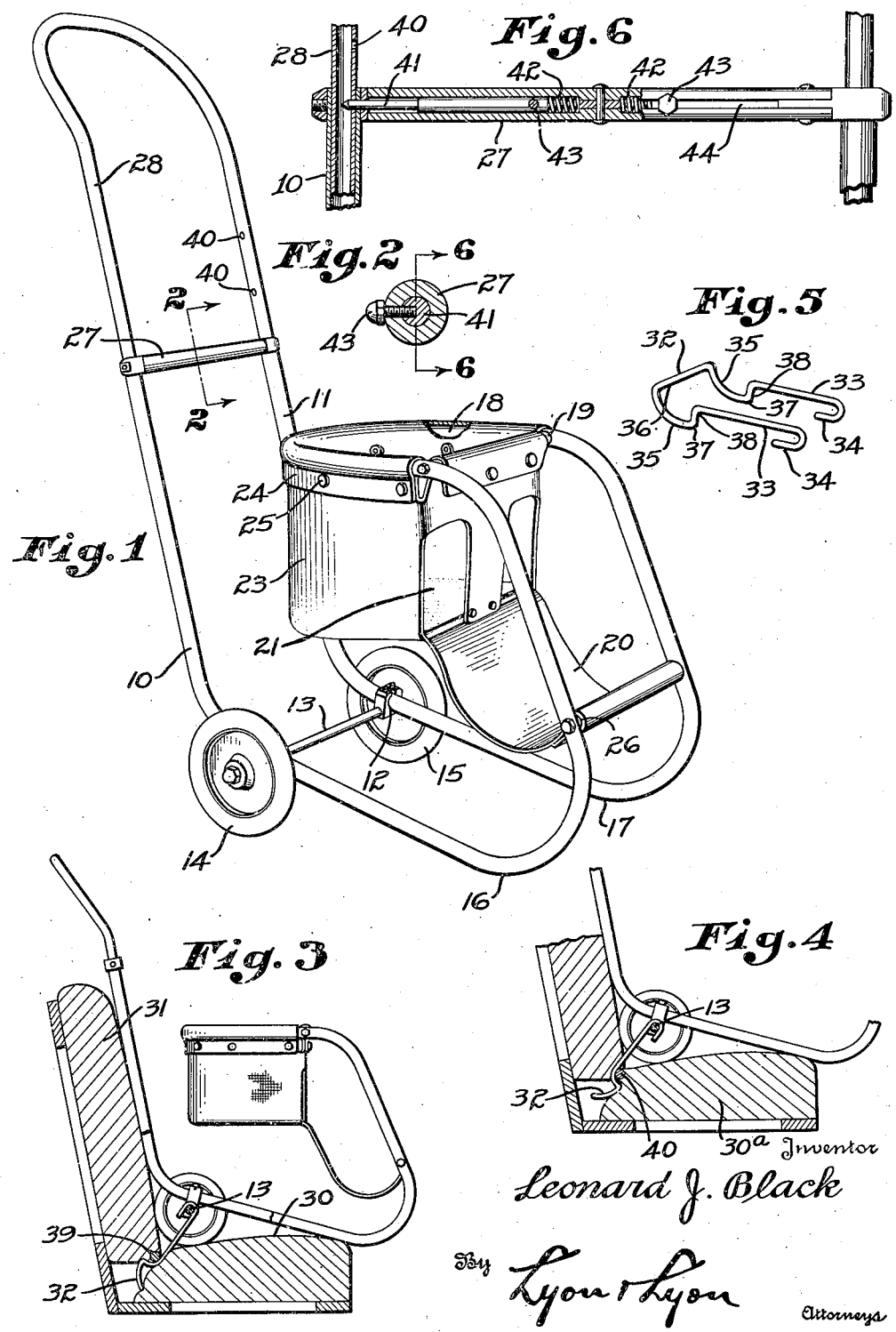
Inventor
Leonard J. Black
By Lyon & Lyon
Attorneys Patented Sept. 27, 1949

2,482,827

UNITED STATES PATENT OFFICE 2,482,827

BABY VEHICLE

Leonard John Black, Hawthorne, Calif.

Application July 28, 1947, Serial No. 764,127

4 Claims. (Cl. 155—11)

This invention relates to a baby vehicle and is particularly directed to a wheeled stroller for supporting a child.

The principal object of this invention is to provide a child's vehicle of this type which may be used for wheeling the child from place to place, or which may be positioned as a unit upon the seat of an automobile. Another object is to provide a wheeled vehicle for supporting a child, which vehicle is provided with skids acting in cooperation with the wheels to support the vehicle and prevent rolling on a level or slightly inclined surface. Another object is to provide a child's vehicle of this type having a seat suspended from a frame and resilient means carried partly on skids for supporting the frame.

Another object is to provide a child's vehicle of this type incorporating a handle for wheeling the vehicle from place to place, which handle is connected to the vehicle independently of the seat supporting means.

Another object is to provide a child's vehicle which may be positioned as a unit on an automobile seat and having anchor means for maintaining the vehicle in position on the seat. Further objects and advantages will appear hereinafter.

In the drawings:

Figure 1 is a perspective view showing a preferred embodiment of my invention.

Figure 2 is a sectional view taken on the line 2—2 as shown on Figure 1.

Figure 3 is a side elevation partly in section showing the vehicle embodying this invention, resting upon the seat of an automobile, with anchor means secured to the rear cushion of the seat for maintaining the vehicle in position.

Figure 4 is a partial sectional detail showing the anchor means of Figure 3 secured to the seat cushion instead of the rear cushion.

Figure 5 is a perspective view showing details of the anchor clip illustrated in Figures 3 and 4.

Figure 6 is a fragmentary view, partly in section, taken showing details of the telescoping handle parts.

Referring to the drawings, a pair of side members 10 and 11 which may be of tubular construction are connected by clips 12 to an axle 13. Wheels 14 and 15 are carried at the opposite ends of the axle 13. The side members 10 and 11 extend downwardly and forwardly from the clips 12 to define skid portions 16 and 17 at the forward end of the vehicle. The side members 10 and 11 then curve upwardly and extend rearwardly and upwardly to support a semicircular frame 18. This frame 18 includes crossbar 19. The frame elements 16, 17 and 18 may be formed from a continuous length of tubing, if desired, and may comprise continuations of the side members 10 and 11.

A child's seat 23 formed of canvas or other suitable material is suspended from the semicircular frame 18 by any convenient means such as the supporting flaps 24 and releasable buttons 25. The resilience of the side members 10 and 11 provides a yieldable support for the frame 18 and seat 23, so that a child sitting in the seat may amuse himself by bouncing in the seat and flexing the side members 10 and 11. A cross brace or stiffener 26 may be provided at the proper location to serve as a footrest, and a bib 20 may extend from the bottom 21 of the seat 23 to the stiffener 26.

A second cross brace 27 is secured between the upper extremities of the side members 10 and 11. Telescopically mounted in the upper ends of the members 10 and 11 is the U-shaped handle member 28 which may be of tubular construction and which extends upwardly and rearwardly from the rear axle. It should be noted that there is no direct connection between the handle member 28 and the frame 18, so that the weight of the child in the seat 23 may flex the side members 10 and 11 without restraint by the handle member 28, or the portions of the side members 10 and 11 which act as extensions thereof.

Means are provided for extending the handle 28 to any convenient height, and as shown, this means includes the telescopic connection between the handle 28 and the members 10 and 11, and a series of spaced holes 40 in the opposite legs of the handle. Latch pins 41 slidably mounted in the transverse strut 27 are adapted to engage the holes 40 to maintain the handle 28 in selected position. Compression springs 42 are provided to urge the pins 41 into the holes 40. Each pin 41 is provided with an actuator element 43 extending through a slot 44 and accessible exteriorly of the strut 27 for manual operation of the pins 41.

When the vehicle is resting on a level or slightly inclined surface, there is no danger that the motion of the child in the seat 23 may cause the vehicle to roll away, because the frictional contact of the skids 16 and 17 offers sufficient resistance to prevent rolling. When it is desired to transport the child in the vehicle, however, the outer end of the handle 28 is grasped in one hand, and the vehicle pivoted about the axle 13 to raise the skids 16 and 17 out of contact with the floor or other surface. The vehicle then may be operated as a two-wheeled baby stroller.

The vehicle is sufficiently small and light weight to be conveniently positioned upon the seat of an automobile, as shown in Figures 3 and 4. The handle 28 may be retracted to reduce the overall height and the wheels 14 and 15 then are placed on the seat cushion 30 in contact with the rear cushion 31. The members 10 and 11 also contact the rear cushion 31 to prevent rearward pivoting of the device about the axle upon sudden accelerations of the automobile. Similarly, the lower portions of the side members contact the seat cushion 30 to prevent overturning in the forward direction when the brakes are suddenly applied. Furthermore, an anchor member 32 is provided for preventing forward motion of the axle 13 with respect to the seat cushion 30.

This anchor member 32 may be formed of a single piece of heavy gage wire having parallel straight sections 33 terminating in return clips 34. Curved sections 35 connect the transverse cross bar 36 with the projections 37 at the other end of the straight sections 33. The projections 37 and straight sections 33 define an anchor notch 38. The shape of this anchor member 32 was developed to cooperate with the various forms of automobile seat cushions and back cushions now in use. As shown in Figure 3, the notch 38 may be turned upwardly to engage an edge rail 39 in the lower forward edge of the back cushion 31. As shown in Figure 3, the notch 38 may be turned downwardly to engage an edge rail 40 in the rear upper edge of the seat cushion 30a. In either case, the clips 34 pass over the axle 13, and the curved sections 35 of the anchor member 32 assist in maintaining the notch 38 in operative engagement.

Having fully described my invention, it is to be understood that I do not wish to be limited to the details herein set forth, but my invention is of the full scope of the appended claims.

I claim:

1. In a child's vehicle of the class described, the combination of a horizontal seat supporting frame, an axle below said frame, wheels on said axle, parallel side members secured to said axle and extending forwardly and downwardly to provide front skids, the skids and wheels cooperating to support the vehicle on a level surface, the side members extending continuously from the skid portions thereof, upwardly and rearwardly to join with the forward portions of the seat supporting frame, a sling seat suspended from the frame adapted to support a child, the resilience of the side members providing a yielding support for said frame, a cross brace extending between the side members to act as a footrest, and a handle element secured to the side members and extending upwardly and rearwardly independently of the seat supporting frame.

2. In a child's vehicle of the class described, the combination of a seat frame, a child's seat suspended from the frame, resilient supporting means for the frame including a pair of side members, wheel means secured to the side members, the side members extending forwardly and downwardly to provide front skids and then extending rearwardly and upwardly to support said frame, the skids and wheels cooperating to support the vehicle on the seat cushion of an automobile seat with the rear wheels contacting both the seat cushion and back cushion thereof, an extensible handle element secured to said vehicle independently of said frame and extending upwardly and rearwardly therefrom, said side members being adapted to contact the back cushion to prevent overturning movement of the vehicle about said wheels.

3. In a child's vehicle of the class described, the combination of a seat frame, a child's seat suspended from the frame, resilient supporting means for the frame including a pair of side members, a rear axle below said frame, wheels on said axle, means connecting the side members to said axle, the side members extending forwardly and downwardly from the axle location to provide front skids and then extending rearwardly and upwardly to support said frame, the skids and wheels being adapted to support the vehicle upon the seat cushion of an automobile seat, with the wheels contacting both the seat cushion and back cushion thereof, and anchor means for maintaining the vehicle in position on the automobile seat, said anchor means including an element removably secured to the axle and extending between the seat and back cushions.

4. In a child's vehicle of the class described, the combination of a seat frame, a child's seat suspended from the frame, resilient supporting means for the frame including a pair of side members, a rear axle below said frame, wheels on said axle, means connecting the side members to said axle, the side members extending forwardly and downwardly from the axle location to provide front skids and then extending rearwardly and upwardly to support said frame, the side members extending rearwardly and upwardly from said axle location, a transverse strut connecting the upper terminal ends thereof, a U shaped handle telescopically mounted with respect to the portions of the side members adjacent said transverse strut, and latch means within the strut cooperable with the handle to maintain the latter in selected position.

LEONARD JOHN BLACK.

REFERENCES CITED

The following references are of record in the file of this patent:

UNITED STATES PATENTS

| Number | Name | Date |
|---|---|---|
| 1,960,022 | Melder | May 22, 1934 |
| 2,347,754 | Shay | May 2, 1944 |
| 2,365,003 | Reinholz | Dec. 12, 1944 |

FOREIGN PATENTS

| Number | Country | Date |
|---|---|---|
| 852,701 | France | Nov. 9, 1939 |